Figure 1:
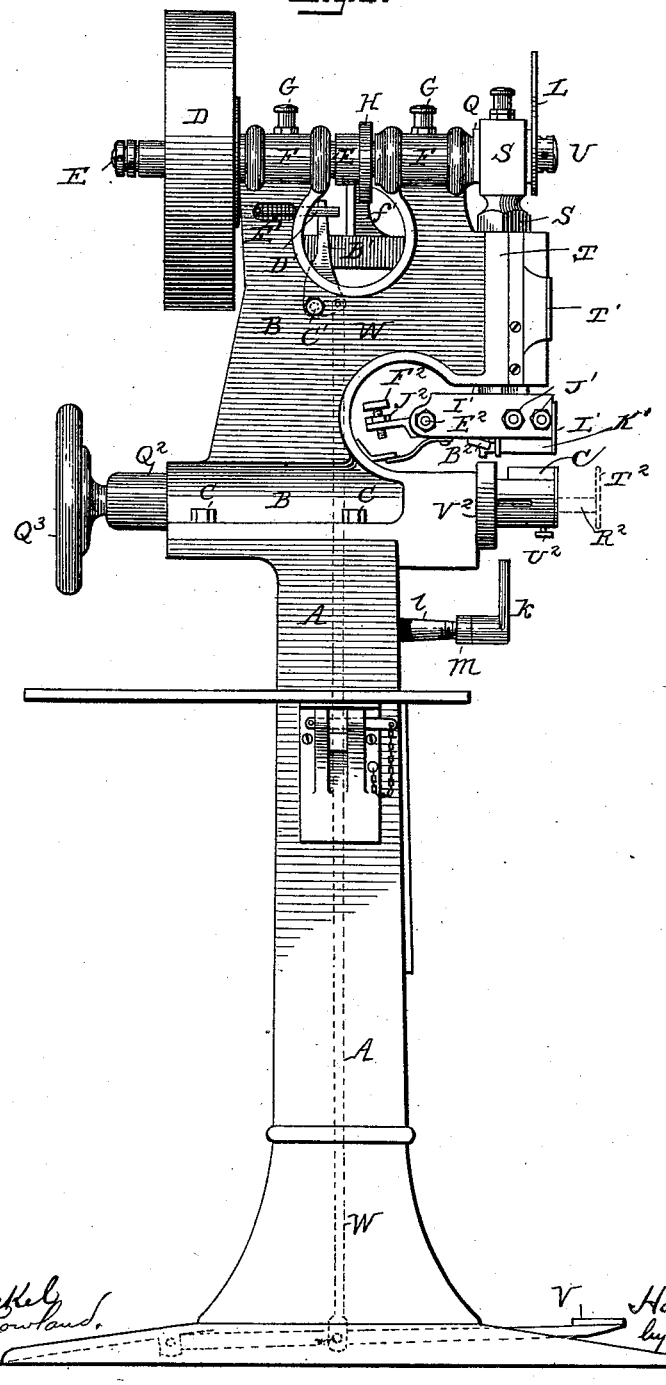

(No Model.)  7 Sheets—Sheet 1.
H. INMAN.
BOX STAYING MACHINE.

No. 537,205. Patented Apr. 9, 1895.

Witnesses  Inventor
  Horace Inman
  by Phillips Abbott
   Attorney (No Model.) 7 Sheets—Sheet 2.

H. INMAN.
BOX STAYING MACHINE.

No. 537,205. Patented Apr. 9, 1895.

Witnesses
Inventor
Horace Inman
by Phillips Abbott
Attorney

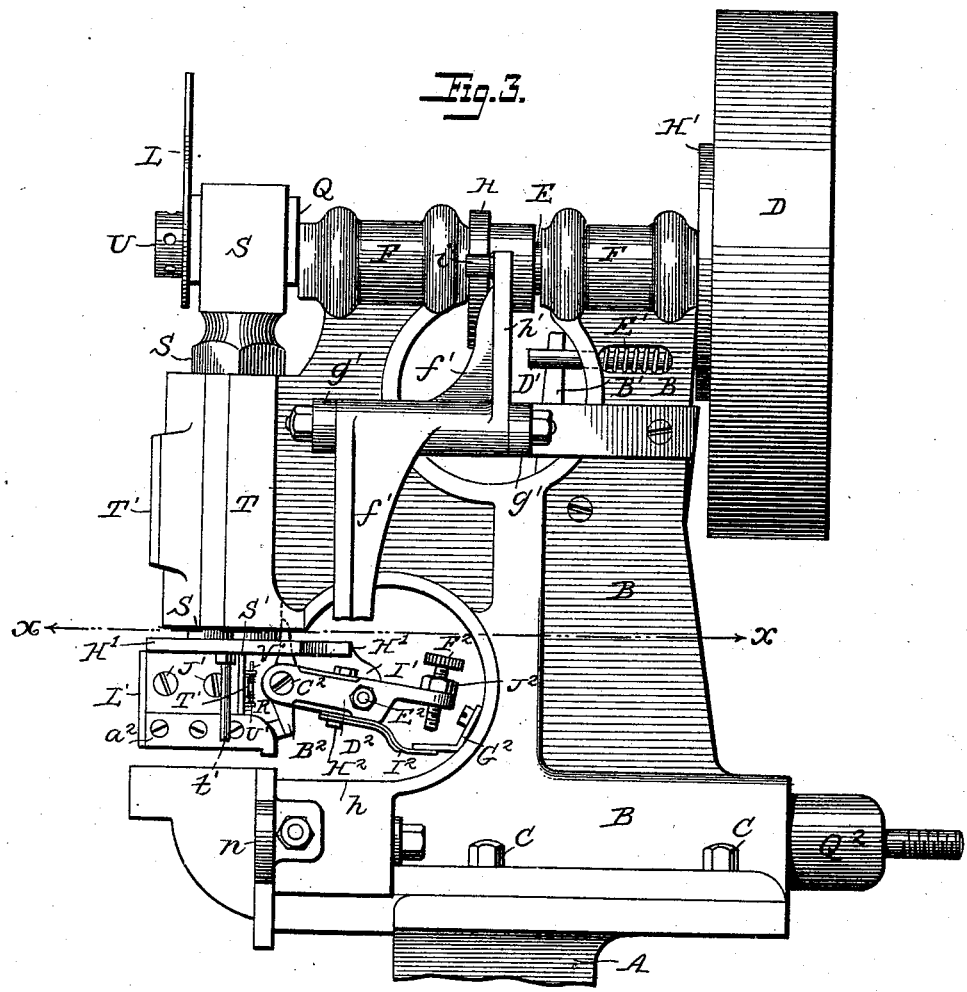
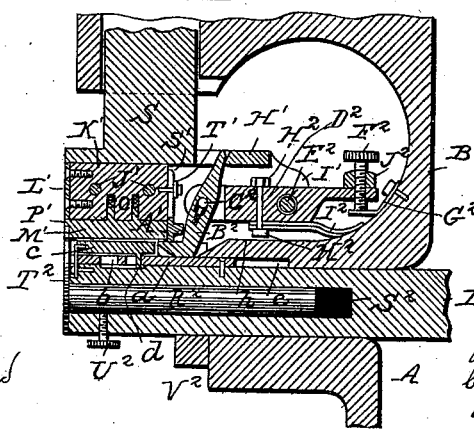

(No Model.)  7 Sheets—Sheet 4.
H. INMAN.
BOX STAYING MACHINE.
No. 537,205.  Patented Apr. 9, 1895.
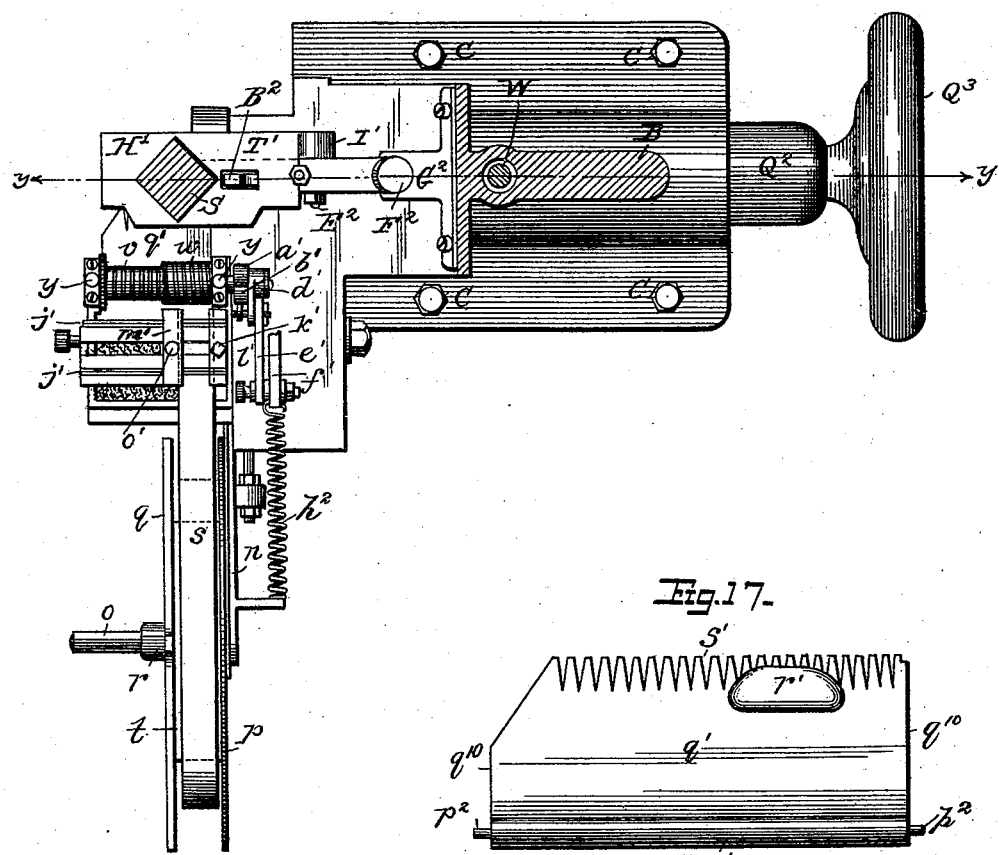
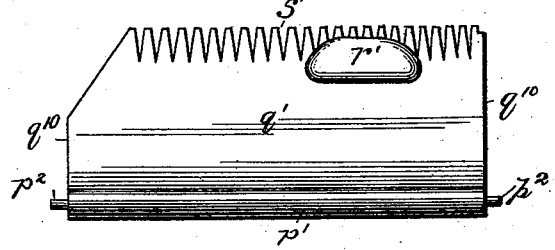
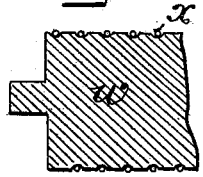
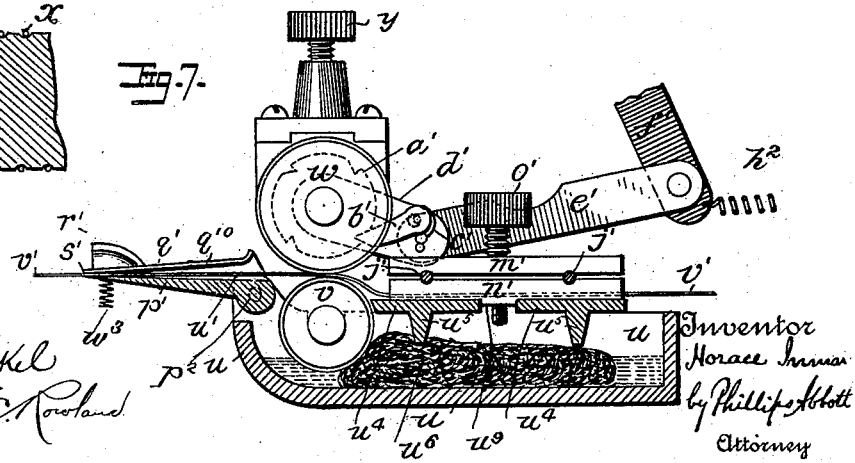
Witnesses
Jno. G. Hinkel
Edward C. Rowland
Inventor
Horace Inman
by Phillips Abbott
Attorney

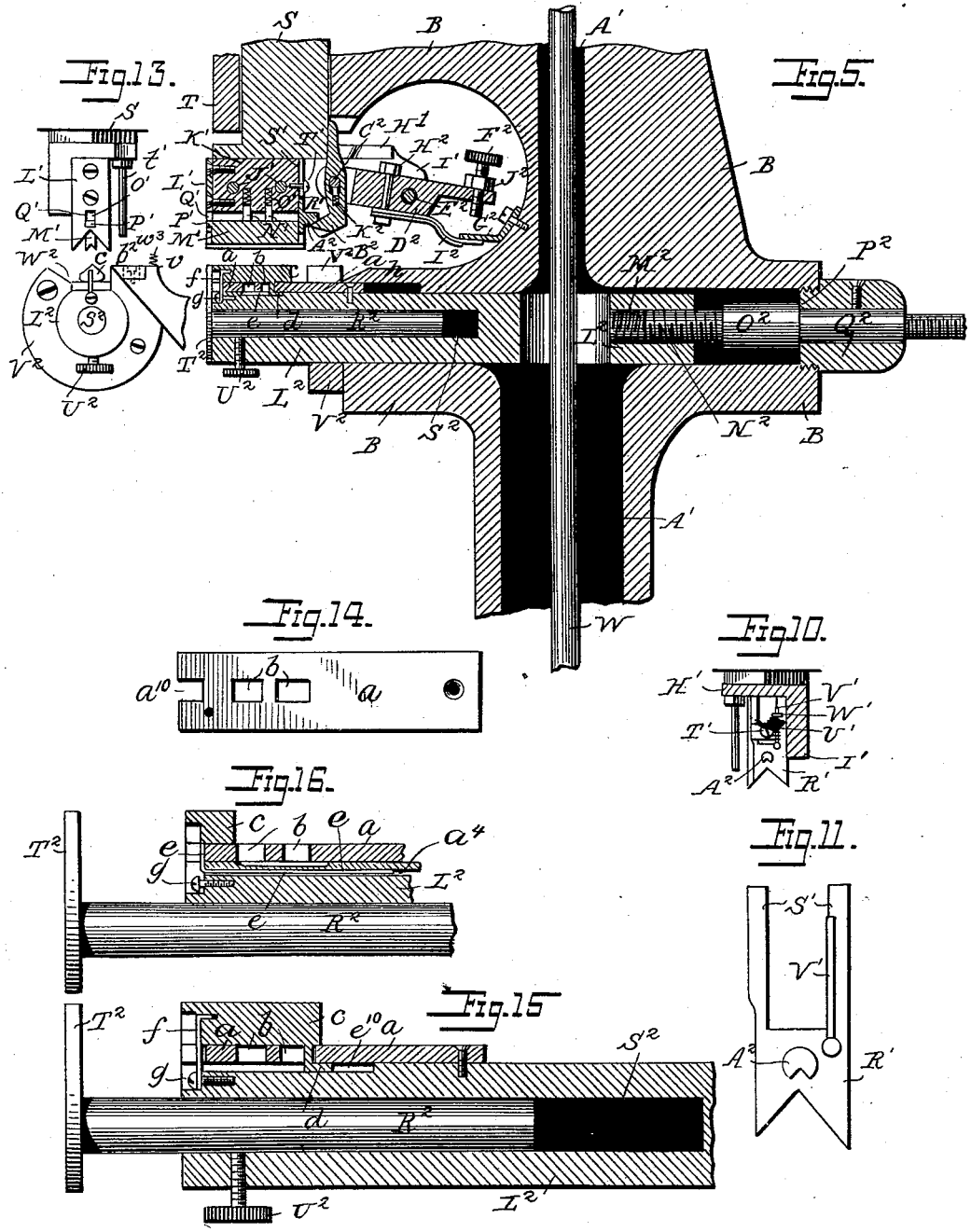

(No Model.) 7 Sheets—Sheet 6.
H. INMAN.
BOX STAYING MACHINE.
No. 537,205. Patented Apr. 9, 1895.
Fig. 20.
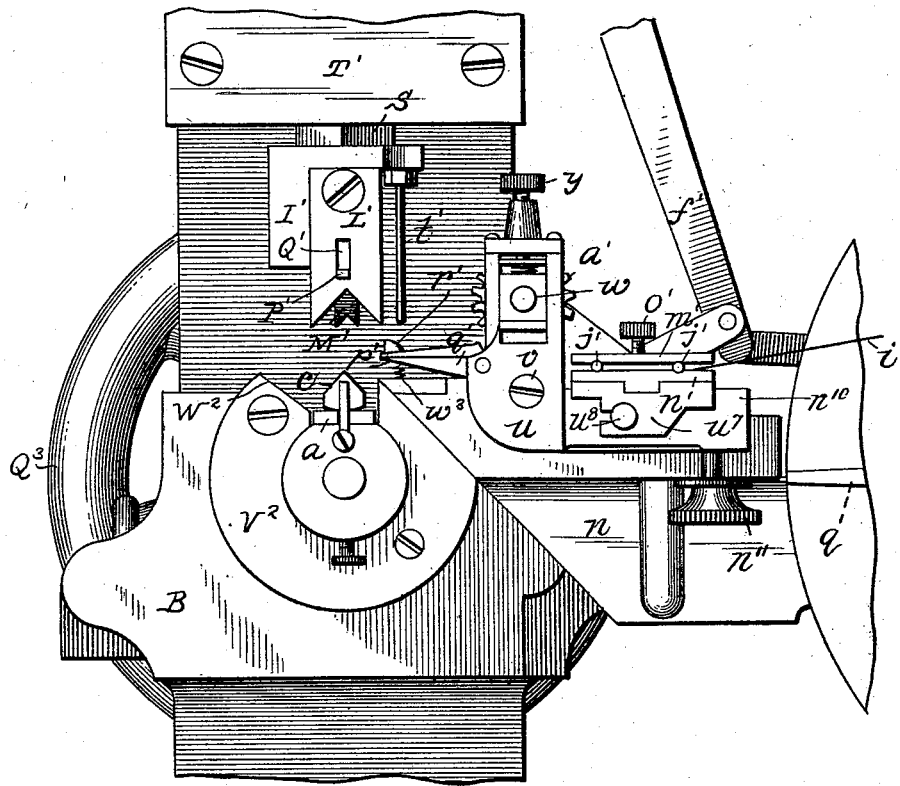
Fig. 8.
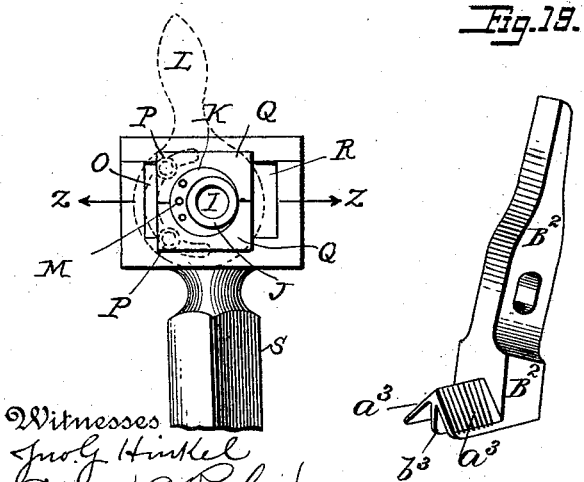
Fig. 18.
Fig. 9.
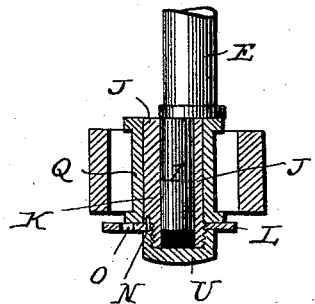
Witnesses
Jno. G. Hinkel
Edward C. Rowland
Inventor
Horace Inman
by Phillips Abbott
Attorney
THE NORRIS PETERS CO., PHOTO-LITHO., WASHINGTON, D. C.

(No Model.) 7 Sheets—Sheet 7.

H. INMAN.
BOX STAYING MACHINE.

No. 537,205. Patented Apr. 9, 1895.

WITNESSES:
Edward C. Rowland.
D. Solis Ritterband

INVENTOR
Horace Inman
BY Phillips Abbott
ATTORNEY

UNITED STATES PATENT OFFICE.

HORACE INMAN, OF AMSTERDAM, NEW YORK.

BOX-STAYING MACHINE.

SPECIFICATION forming part of Letters Patent No. 537,205, dated April 9, 1895.

Application filed February 7, 1894. Serial No. 499,406. (No model.)

*To all whom it may concern:*

Be it known that I, HORACE INMAN, a citizen of the United States, and a resident of Amsterdam, in the county of Montgomery and State of New York, have invented certain new and useful Improvements in Box-Staying Machines, of which the following is a specification.

My invention relates to improvements in machines for attaching stays to the corners of boxes, and it consists in improvements in the plunger, whereby it may be adjusted vertically, also in improved devices for supporting the boxes during the staying operation; also in improvements in devices whereby the staying material is held, carried within and attached to the inside of the corners of the boxes; also in the construction and peculiar arrangement and combination of the parts whereby the work last above mentioned is done automatically by the machine; also in improved methods of supporting the lower die or anvil; also in improvements in devices for cutting off the staying material and for dampening the same; also my invention includes the general construction, arrangement and combination of the machine as herein described and shown in the drawings hereof.

My improved machine is of the class now well known for applying to the corners of boxes made of paste-board, straw-board, veneer and other like materials, staying pieces or strips composed ordinarily of paper, linen or other textile fabric, whereby the corners are supported and made strong.

Figure 2:
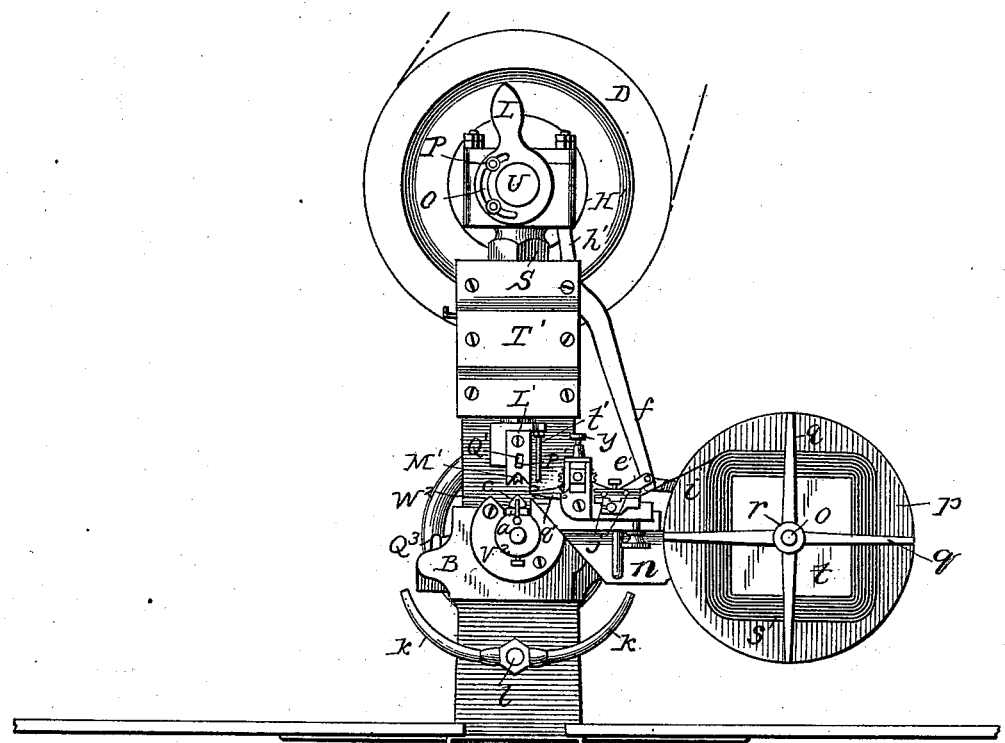
Figure 12:
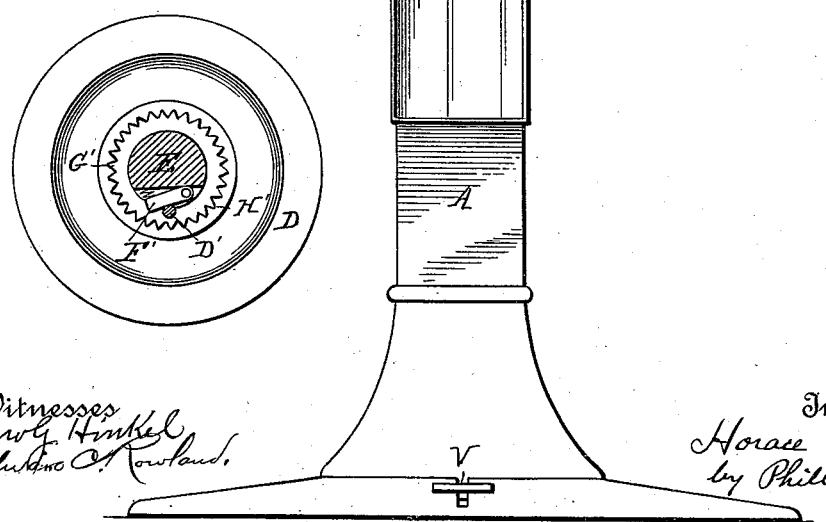
Figure 21:
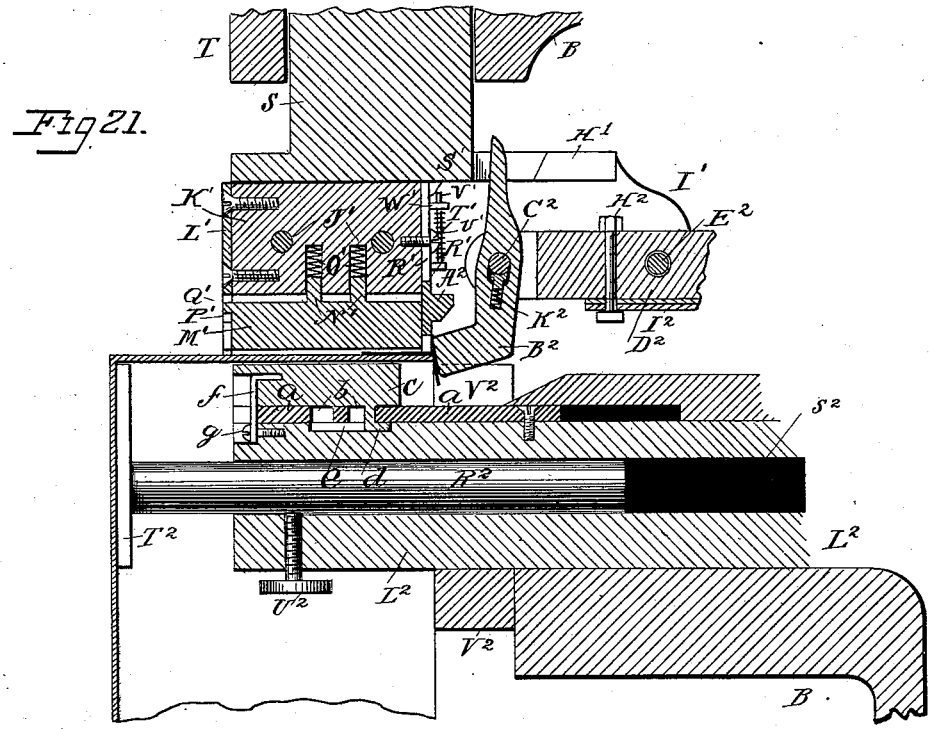
Figure 22:
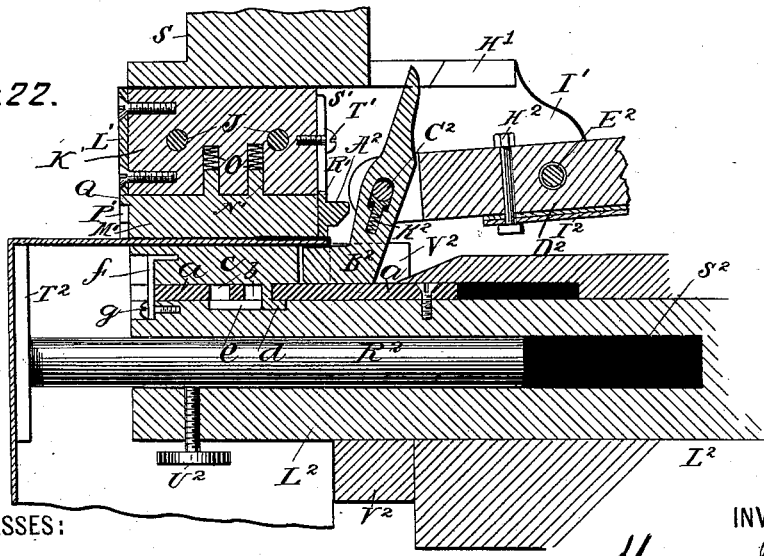

In the accompanying drawings, Figure 1 illustrates an elevation of the machine complete, viewed from one side thereof, the dies being separated. Fig. 2 illustrates an elevation of the machine complete, viewed from the front. Fig. 3 illustrates an elevation of the machine taken at the side opposite that shown in Fig. 1, the strip feeding mechanism and co-acting parts being removed. Fig. 4 illustrates a plan view taken on the line X, X of Fig. 3. Fig. 5 illustrates a vertical section of the dies and co-acting parts, taken on the line Y, Y of Fig. 4, the machine being broken away both above and below and some of the parts shown in elevation. In this figure the parts are in the position they occupy when the plunger begins to descend. Fig. 6 illustrates a vertical section similar to Fig. 5, illustrating the position of the parts when the dies are in their lowermost position and about to apply their ultimate pressure. Fig. 7 illustrates a detail in vertical section of the mechanism for feeding and dampening the staying material. Fig. 8 illustrates a detail in elevation of the mechanism for vertically adjusting the plunger. Fig. 9 illustrates a detail of the devices shown in Fig. 8, taken on the line Z, Z of that figure. Fig. 10 illustrates a detail partly in section and partly in elevation of the parts which press and hold the staying material smoothly on the corner of the box during the turning in and squeezing operation. Fig. 11 illustrates the pressure plate shown in Fig. 10, which presses and holds the staying material on the corner of the box during the turning in operation. Fig. 12 illustrates a detail of the devices whereby the driving wheel of the machine is thrown into and out of gear. Fig. 13 illustrates a front view of the dies, cutter, &c. Fig. 14 illustrates a plan of the plate or base upon which the lower die rests. Fig. 15 illustrates an enlarged view in vertical section of the lower die, its supporting bar and co-acting parts. Fig. 16 illustrates a sectional view of a short die and its means of support. Fig. 17 illustrates a plan in detail of a part of the strip manipulating mechanism. Fig. 18 illustrates one of the dampening rollers showing the thread within the grooves of the roller. Fig. 19 illustrates a detail view of the tucking finger. Fig. 20 illustrates an elevation taken from the front, of the dies and the parts immediately adjacent thereto. Fig. 21 illustrates the position of the parts (including a box corner), when the upper die has so far descended that the pressure plate has taken a bearing on the box corner stay and the tucking finger has begun to bend the projecting end of the staying strip downwardly preparatory to carrying it within the box corner. Fig. 22 illustrates the position of the parts (including a box corner) when the tucking finger has completed the tucking in of the staying strip and the parts are in position for the final squeeze.

A is the standard of the machine. It is preferably made of cast iron as usual in such cases.

B is the upper part of the frame and is also preferably a casting. It is bolted, as at C, C to the top of the standard A.

D is the driving wheel which is mounted upon a shaft E, which turns in bearings F, F in the casting B, B.

G, G are oil cups for lubricating the journals F, F.

H is a cam keyed to the shaft E. At its forward end (see more particularly Figs. 3, 8 and 9) the shaft E is provided with a crank I.

J is a sleeve which is slipped on the crank I, and this sleeve has at one side a thickened portion K, which is eccentric to the axis of the sleeve.

L is a lever adapted to be slipped on the forward end of the sleeve and is provided with a number of pins N (see Fig. 9) which enter holes M (see Fig. 8) in the thick part of the eccentric of the sleeve J. This lever L, (see Figs. 2 and 8) is provided with a slot O, through which pass screws P, P which engage with a bearing block Q, which slides through a slideway R, made in the head of the plunger S. The plunger S moves through a slideway T on the front of the machine and at its lower end the upper die and its co-acting parts are arranged as will be hereinafter explained. The front of the slideway T may be removed by unscrewing and taking off the front plate as shown at T'.

U is a cap (see Figs. 2, 3 and 9) which is screwed to the end of the sleeve J, and confines the lever L, in place. This cap is removed in Fig. 8.

V (see Fig. 1) is a treadle which is pivoted to a vertical rod W (see Figs. 1 and 5) which extends upwardly through the center of the standard and through an opening A' in the casting B, and at its upper end it is pivoted to a bell crank lever B' which is pivoted at C' to the frame B. The upper end of this lever engages with the horizontally sliding pin D' (see Fig. 1), which is normally pressed to the left by a spring E'. The driving wheel or pulley D (see Fig. 12) is loose on the shaft E, and that shaft is provided with a spring pawl F', which engages during the revolution of the shaft E with the end of the pin D' which projects so as to engage with it.

G' is an annular rack on the hub H' of the driving pulley D, with which the pawl F' promptly engages the instant the pin D' is withdrawn by the application of pressure to the treadle V, and when that pressure is removed, the spring E' again projects the pin which immediately thereafter engages with the pawl F' and lifts it out from the rack G' and the motion of the machine ceases. The construction and arrangement of the parts are such that the plunger is always elevated and the dies separated when the machine stops.

The arrangement of the dies and of the devices which press upon and hold the corner staying material, and bend it downwardly and inwardly so as to apply it to the inside of the corners of the boxes is as follows, special reference being had to Figs. 3, 5, 6, 10, 11, 19, 21 and 22: On the lower end of the plunger S, there is formed a horizontal plate H' which has a vertical flange I' and through the flange screws J' pass which fasten a block K' to the flange I' and to this block the parts composing the upper die are attached, so that by simply unscrewing the screws or bolts J' all of these parts may be taken away from the machine for repair. To the front of the block K' is screwed a plate L' in which is a slot Q'. (See Figs. 2 and 5.) The upper die M' is provided with two upwardly extending studs or fingers N', N', having cushions O', O' above them, which are housed in recesses or cavities in the block K'. The die M' has a lip P', which moves in the slot Q' made in the plate L'. On the other or rear side of the die M' there is a vertically moving plate R' (see Figs. 10 and 11) having two upwardly extending parts S' which straddle a screw or bolt T', and a spring U' which encircles a spindle V' which is fastened to the plate R' and abuts at its upper end against a stud W' on the flange or on the block K' as the case may be, which normally depresses the sliding plate R'.

$A^2$ is a stud fastened to the face of the sliding plate R' which engages with the lower end of a swinging and vertically movable part $B^2$, which I will call the tucking finger. It is pivoted by a pivot $C^2$ to a rocking lever $D^2$ which is pivoted at $E^2$ to the flange I'. At its rear end this lever $D^2$ is provided with a set screw $F^2$, which engages with a stop $G^2$ on the frame of the machine and on the under side of the stop $G^2$ and attached to the lever $D^2$ by bolt $H^2$ are springs $I^2$ so that as the plunger rises and falls, the lever $D^2$ will be rocked upon its pivot $E^2$ by the impingement of the set screw $F^2$ in one direction and the springs $I^2$ in the other against the stop $G^2$ and it will be noticed that the set screw $F^2$ is adjustable by means of the set nut $J^2$ so that I can adjust exactly the downward movement of the forward end of the tilting lever $D^2$. It will also be noticed that the tucking finger $B^2$ is slotted where the pivot $C^2$ passes through it, see Fig. 21, and that within the slot is a spring $K^2$ which normally depresses the tucking finger $B^2$. This is provided so that the tucking finger may move under the corner of the box, loose, so to speak, prior to the squeeze of the upper die and also so that the upper die may continue its downward movement and not affect the position of the tucking finger. If the construction of the parts and their adjustments be suitable, this spring will not be necessary, because the spring of the parts, plus inevitable lost motion will permit the stated operation of the parts even if the spring be omitted. I employ an automatic oiler (not shown) in connection with the tucking finger, so that it is lubricated at its lower end where it comes in contact with the plate $a$ at each operation of the machine.

Referring to Fig. 19, the lower end of the tucking finger is cut out on its forward end, so as to produce three thin edges or plates, two lateral ones $a^3, a^3$, which are at right angles to each other, meeting on a right angle at the top, and a central one $b^3$, midway between them. The central one $b^3$ first comes in contact with the upwardly presented angle of the projecting staying strip, and breaks it down before the side plates $a^3, a^3$ act upon it. Thus the strip is folded upon the inside of the box corner smoothly and without wrinkles or breaks. The outer surfaces of the side plates $a^3, a^3$ being at right angles to each other, properly fit the corner of the box on its inside and press the folded in part of the staying strip thereon.

Referring now to the lower die and its co-acting parts, $L^2$ is a heavy bar of any preferred cross section (shown cylindrical in the present instance) which slides horizontally through an opening in the main casing. It is recessed at its rear end as at $M^2$, which recess is interiorly threaded. The threads engage with like threads on the part $N^2$ of the spindle $O^2$, which is collared as at $P^2$ against a block or stop $Q^2$, which is threaded into the casting B, and is provided on its outer rear end with a hand wheel $Q^3$, so that by turning the hand wheel the bar $L^2$ is moved forwardly or rearwardly through the machine.

$R^2$ is a spindle which slides longitudinally through a hole $S^2$ made in the forward end of the bar $L^2$ and on the forward end of the spindle $R^2$ is a plate $T^2$ the upper end whereof is made rectangular so as to fit the corner of the box and $U^2$ is a set screw whereby the spindle $R^2$ may be held in any desired projected position. There may be a groove along the under side of the spindle $R^2$ if desired, in which the end of the set screw $U^2$ may engage to prevent rotation of the spindle.

$V^2$ is a circular piece of metal cut out at its upper surface as at $W^2$ (see Figs. 2, 13 and 20) and against this circular plate the most forward edges of the boxes or covers as the case may be, abut. To the upper surface of the bar $L^2$ is screwed a plate $a$. (See particularly Figs. 5 and 14.) This plate has two holes through it, $b, b$.

$c$ is the lower die. It is supported upon the plate $a$ by a downwardly extending piece of metal $d$ which passes through one of the openings $b$ in the plate $a$ and catches under that plate by entering a longitudinal passage or groove $e^{10}$ made in the upper surface of the the vertical shank of the hanger. Fig. 6, is a bar $L^2$. (See Fig. 15.) The other end of the die $c$ is held in place by a piece of metal $f$ which is fastened at its upper end to the die $c$ and at its lower end to the bar $L^2$ by a screw $g$ which passes through it and enters the bar. The connections between these parts are not rigid. On the contrary, they allow considerable lateral movement of the lower die for reasons hereinafter explained. The under side of the die $c$ is made convex or rounding (see particularly Figs. 2 and 20), and it will be observed that since the means for holding the die upon the plate $a$ are not rigid, they allow a rocking motion of the die $c$. This has a co-acting effect in conjunction with the upwardly yielding upper die M' during the first portion of their squeezing action upon the staying material, because, owing to there being nothing rigid or absolutely fixed in the position or exact angles of these dies relative to each other, they will readily yield to accommodate themselves to differences in thickness of the material between them. This is a valuable feature of my machine, for I ordinarily apply great pressure through my dies, much more than is usually employed in such machines, and straw-board, which is the material from which the boxes are most generally made, is very apt to be irregular in thickness, also in density, and is also apt to have foreign matter in its body, and if the dies were not adapted to accommodate themselves to these irregularities or differences, fracture of the machine might result, and in any event the pressure upon the two sides of a box corner would frequently not be even, and since I prefer to use but little adhesive material and heavy pressure, it is important to have the pressure equal on both sides. I find that but little adhesive material and considerable pressure give much more satisfactory results than the old methods, because the corners of the box are smoother and more firm and the staying strip is partly embedded therein, so that the thickness is reduced. The two slots or holes $b$ are made in the plate $a$, so that when the lower die is a short one, the finger $d$ may be placed in the left hand opening or slot $b$ and it will catch under the rib which runs across between these openings and hold the die in place. Where the die is very short, I arrange the parts as shown in Fig. 16, that is to say, I attach to the under side of the short die a long finger or wire $e$ which is substantially the same shape as the finger $d$ of the other die, except that the horizontal part is much longer and this long finger enters a notch $a^{10}$ (see Fig. 14) and extends through an elongated channel or hole $a^4$ cut or made in the bar $L^2$.

To consider now more specifically the devices which press upon, hold and turn the portion of the staying strip which projects beyond the edges of the boxes inwardly over those edges and adjusts the same to the inside of the boxes, special attention is called to Figs. 5, 6, 10, 11, 19, 21 and 22. The parts when at rest before descent are in the position shown in Fig. 5. As the plunger descends it carries down with it, the pressure plate R', which being depressed by the spring U' is about even with the lower edge of the die M', which it will be noticed is depressed by the springs O', and the stud $A^2$ upon the pressure plate R', engaging with the lower end of the tucking finger $B^2$, carries that down with it, tipping the lever $D^2$ in so doing; thus soon bringing the set screw $F^2$ down upon the stop G². After the plunger, carrying the parts above stated, has descended a certain distance (see for illustration Fig. 21) the two dies come together, clamping the box corner and the staying material between them, with, however, a yielding pressure because of the springs O', which permit the plunger still further to descend without, however, depressing the upper die M' and about this time, the pressure plate R' has also reached the staying strip and presses upon it, the adjustment of the parts being such that the corner of the box is so located by the guide plate V² that the pressure plate is just covered by the projecting edge of the box. In other words the box projects inwardly beyond the inner end of the die M', a distance about equal to the thickness of the pressure plate, and the parts being in the position above set forth, the lower forward point of the tucking finger B², sliding downwardly in contact with the surface of the plate $a$ engages with the projecting end of the staying strip, bending it downwardly, and the plunger, further descending, causes the tucking finger to descend still farther and make contact with what may be properly termed an abutment, comprising in the present instance the upper side of the plate $a$, and, owing to the fact that the point of first contact of the finger with the abutment is forward of the point of support, i. e., the pivot C², the tucking finger is swung inwardly by the combined action of the abutment and the downward movement of the plunger and pivot point under the plate R', and also under the inner end of the die M', carrying the end of the staying strip with it. The parts then assume the position shown in Figs. 6 and 22. The plunger S continues to descend, still further compressing the springs O' and closing the opening between the lower side of the block K' and the die M'. Thus it will be observed that the pressure plate R' which maintains its pressure upon the staying strip at the edge of the corner during the above stated operations holds it against displacement and prevents it from buckling or "humping" up as it is called, while the tucking finger is bending it downwardly and carrying it to the inside of the corner of the box; and it will also be observed that the front end of the tucking finger, being formed with the three edges or plates $a^3$, and $b^3$, the portion of the staying strip that is carried within the corner is folded and bent in such manner as to be free from wrinkles and that the total result is a smooth, handsomely finished and securely stayed corner. As before stated, by the time the tucking finger has reached its ultimate position under the upper die, then the plunger proper, or rather the block K' attached to it makes contact with the upper side of the upper die and the final squeeze is exerted upon the box corner and upon the staying strip, whereby the latter is firmly pressed upon and in fact, in most instances, partially embedded in the material forming the box, both on the outside and inside of the corner, thus making the box smoother and more marketable.

When relatively deep boxes or covers are being made the rod R² will be projected as far as necessary so that the plate T² on its outer end will serve as a support for the outer or bottom part of the box. It is made adjustable, so as to accommodate boxes or covers having different depths. The plate T² is rectangular or of such other shape as to fit into the corner upon which the stay is to be applied, and in order to properly support or guide the box or cover as a whole, I provide what I term horns $k, k$ (see Figs. 1 and 2) which, if desired, may be adjusted toward and from the machine by screwing them on and off from a stem $l$ (see Fig. 1) and holding them in any desired position by a set nut $m$. It will be observed that it is necessary to adjust the lower die in its forward or rearward position, because the tucking finger B² has always a fixed position when in position to receive the final squeeze. Consequently I provide to and fro adjustments for the bar L³ and also the openings $b$ in the plate $a$ whereby I can use lower dies of greater or less length and when necessary to use very short lower dies, as for instance when making very shallow covers, I provide special means for holding them upon the plate $a$ as before stated.

Referring now to the devices which automatically dampen and apply the adhesive material to the strip of staying material, and which cut it off in pieces for application to the corners of the boxes, special reference being had to Figs. 2, 4 and 7, $n$ is an arm projecting from the side of the machine, upon which is fastened a spindle $o$ over which a rotary reel slips and on which it rotates. This reel comprises or may comprise, a metallic disk $p$ and a series of fingers $q$ which are attached to a hub $r$.

$s$ is a coil of the staying material in the form of a long strip or tape, which is preferably, although not necessarily square in shape, and provided with a card-board or wooden center piece, which has a hole in the center, adapted to fit over the spindle $o$.

$u$ (see Fig. 7) is a tray or box adapted to contain water, which dampens the staying strip, it preferably having already been treated with adhesive material and only requiring to be dampened to make it adhere. This box may be of any suitable construction and supported in any suitable way, but it is shown herein as supported on a projection $n^{10}$, extending laterally from the plate $n$, and as being held therein by a thumb-screw $n^{11}$.

$v, w$ are two rollers suitably journaled on the sides of the box $u$. The upper one $w$ has thumb screws $y, y$, whereby its journals may be elevated or depressed as desired, and on the shaft of the upper roller there is a ratchet $a'$ with which operates a pawl $b'$, normally held up against the ratchet by a spring $c'$.

$d'$ and $e'$ are two levers which are pivoted together and $f'$ is a lever which runs upwardly and is pivoted at $g'$ (see Fig. 3) to the frame of the machine, and it has a short arm $h'$ upon which is a roller $i'$ which engages with the cam H on the main driving shaft of the machine.

$h^2$ (see Fig. 4) is a spring, which always pulls the lower end of the lever $f'$ backwardly, so as to maintain the roller $i'$ on the short arm $h'$ in contact with the cam H.

Mounted on the box $u$, is a frame comprising essentially two bars or plates $u^4$, having downwardly projecting ribs $u^5$, extending into the box, which may serve to hold in place a mass of absorbent material $u^6$, and this frame is secured to the box by a projecting lip $u^7$ and set-screw $u^8$, on one side, and by a screw or bolt $k'$, on the other side, this latter screw or bolt passing through an upward extension of the plate. Mounted in and extending laterally from this upward projection are the rods $j'$, $j'$, and adjustably mounted upon these rods are the guides $m'$, $n'$, which are clamped together and held in any desired position upon the rods by a set screw $o'$, according to the width of the strip $s$, of adhesive material. The lower guide $n'$, as shown in the drawings, has a projection $u^9$, which extends into the space between the bars $u^4$, and serves to aid in holding the guides in position against longitudinal strain.

The surfaces of the two rollers $v$ and $w$ are grooved as shown in Figs. 4 and 18, the upper roller $w$ being broken away in the first figure, and these grooves preferably run from right to left, in one of the rollers, and from left to right in the other, so that on their adjacent sides the grooves will be parallel to each other, and in the lower roller which revolves in the water or adhesive material as the case may be, in the box $u$, these grooves are filled with thread or cord which, becoming soaked with the water conveys it more plentifully and more evenly to the under side of the staying strip. Thus it will be seen that the moisture or water will be applied to the under side of the staying strip in a series of lines inclined to the longitudinal length of the strip, the threads $x$, lying in the grooves of the under roller, receiving and delivering the moisture to the strip in what may be termed diagonal, parallel lines on the strip, while the grooves in the upper roller $v$, will coincide with these lines and not exert too great a pressure on the strip at this point, so that practically the space between the grooves becomes the feeding portions or surfaces of the rollers, while the grooved portion of the roller $w$, supplies the bulk of the moisture, in the manner above stated, to the under surface of the strip.

$p'$ is a projecting pivoted part of the box and $q'$ is a comb-like device which is fastened rigidly to the part $p'$, being provided with lips or lateral connecting plates $q^{10}$ (see Figs. 7 and 20) there being, however, a space between them as shown, which is wider at the rear than at front, where it is simply a slit through which the staying material may pass.

$r'$ is a piece of metal soldered to the upper side of the comb against which a finger $t'$ (see Figs. 2 and 13) strikes when the plunger is depressed. The upper side of the part $p'$ is corrugated or made in the form of ribs $u'$. (See Fig. 7.) These corrugations on the upper side of the part $p'$ and also the teeth $s'$ of the comb run in the direction of the movement of the staying material and are provided so that there may be as little surface as possible against which the staying material $v'$ (see Fig. 7) shall rest during its passage through the device. These parts $p'$ and $q'$ taken as a whole are pivoted at their rear ends to the sides of the box $u$ by pivots $p^2$ projecting from the rear enlarged part of the part $p'$. (See Fig. 17.) These pivots $p^2$ enter holes in the sides of the box $u$ and act as axes for the conjoined parts $p'$ and $q'$; and a spring $w^3$ (see Figs. 7 and 13) rests under the edge of the part $p'$ and normally throws it upwardly thus pulling the staying strip away from the lower cutting die against which it has been pressed by the upper cutting die at each operation of the machine, thus preventing any sticking of the strip to the lower cutter, which would interfere with the proper feeding of it.

Referring to Fig. 3, $a^2$ is the upper cutting die which may form part of the block $K'$ or for convenience of sharpening, it may be separate and screwed to one side of the block. (See Fig. 6.) It is moved vertically at each up and down movement of the plunger S. The counterpart or lower cutting die is seen at Fig. 13 at $b^2$, it being secured to a portion of the frame by screws. The staying tape or strip is fed by a pawl and ratchet movement which operates the feeding rollers $v$ and $w$ already explained, between the part $p'$ and the comb $q'$ and just the right amount of tape is caused to project beyond the cutting dies, and as the plunger comes down, they sever the small piece of the strip necessary for staying each corner, from the main strip. This takes place immediately after the initial yielding pressure of the dies has been applied to the staying piece so that no displacement of it is possible and the spindle $t'$, at this time presses the parts $p'$ and comb $q'$ down upon the lower cutting die, so as to lay the staying strip squarely and smoothly upon it, that the cutting may be evenly and easily effected, and after each cut, the spring $w^3$ again lifts the strip free from contact with the lower cutter, as before stated.

The operation of the machine is as follows, reference being had for the details of operation of particular parts to the specific description already given: Normally the driving wheel D turns loose on the main driving shaft. The operator having adjusted all parts to adapt them to stay the particular boxes or covers desired, picks up a box and places it over the lower die, and against the supporting horns $k$, $k$ and upon the plate $T^2$ if it be used, and up against the guide plate or stop V². He then applies his foot to the treadle, whereupon the pin D' is withdrawn from contact with the spring pawl F' and immediately that pawl engages with a tooth in the rack G' opposite to it, whereupon the machine is thrown into gear and commences to operate. Its first operation is to actuate the feed devices for the staying strip. Immediately thereafter the plunger commences to descend and the dies primarily and with yielding pressure engage with the staying strip as stated and hold it. The cutting dies, meantime, cut off the necessary length to stay one corner, and the pressure plate engages the cut off piece near the edge of the corner of the box. The tucking finger then folds and bends it downwardly and carries it within the box corner. During all this time, the plunger has been descending and finally, when the tucking finger has swung on a curve fully in place beneath the corner, the final hard squeeze takes place, and the corner is completed. The parts then all return to their primary position, the box or cover is moved to present another corner and the operation is repeated, until all the corners are stayed.

It will be noticed that in my machine the parts are so constructed and combined that when properly adjusted and "timed" all of the above recited steps or operations, with the exception of feeding the strip, take place during the descent of the plunger and in fact are effected by that descent, so that they take place in succession and with the least possible power and in the shortest possible time. This latter feature is of great importance and value in this line of manufacture. This result is obtained because in my machine, there is no backward or reciprocating movement, and no dwells until the act of staying the corner is completed, and then all parts return to primary position while the operator is shifting the box from corner to corner. Thus there is no lost time or power. Also in my machine, lower dies of any length may be placed in position in a moment's time, and without altering the position and arrangement of any part of the machine, except to adjust the bar L²; and the lower dies are simply blocks or pieces of metal, all in one piece and adapted to rock as a whole on their supporting plate, and they being as a whole, free from longitudinal movement, support the corner of the box during the entire squeezing operation. Also my tucking finger, because of its movements first vertically downward, then swinging inwardly on a curve under the corner of the box, performs the dual functions of a bender for the staying strip and as a tucker to fold it over the edge of the box and tuck it snugly in the inside thereof during which operations, the pressure plate prevents displacement or puckering on the outside, and it will be noted that the movements and action of the tucking finger are almost identical with those of the finger of an operative when this work is done by hand, that is to say, there is first a bending movement, at say, right angles to the corner of the box, whereby the staying strip is pushed over, and then a curved and tucking movement, practically identical with that of the finger of an operator, which "wipes" as it is called, the end of the strip on to the inside of the corner and presses it thereon.

I do not limit myself to the details of construction shown and described, because they may be considerably varied without departing materially from the essentials of my invention. In particular it is not always necessary to employ the pressure plate R'. The upper die M' may be extended the width of the pressure plate and the tucking finger will then co-act with it, the same as with the pressure plate.

I claim—

1. The combination of a plunger, an upper die attached to it, a lower die, a pressure plate on the plunger, a tucking finger connected with the plunger and a stop on the frame which engages with a pivoted lever which supports the tucking finger during the descent of the plunger, substantially as set forth.

2. The combination of a plunger, a die attached to it, a cushion interposed between the two, a pressure plate on the plunger, a lower die and a tucking finger pivoted to a lever, which is connected to the plunger, the rear end of which makes contact with a stop on the frame during the descent of the plunger, substantially as set forth.

3. The combination of a plunger, a die attached to it, a pressure plate on the plunger, a tucking finger pivoted to a lever, which is connected to the plunger, the rear of which makes contact with a stop on the frame, during the descent of the plunger, a lower die, cutting dies, one of which is connected to the plunger and the other at or near the lower die, substantially as set forth.

4. The combination of a plunger, a die attached to it, a cushion interposed between the two, a pressure plate on the plunger, a lower die, loosely supported upon a base by means of a spindle or finger rigidly attached to the die and which engages with a recess in the base, a tucking finger pivoted to a lever which is connected to the plunger, the rear of which lever makes contact with a stop on the frame during the descent of the plunger, cutting dies, one of which moves with the plunger and the other stationary at or near the lower die, substantially as set forth.

5. The combination of a plunger having an upper die, a horizontally movable bar adapted to support the lower die, a plate upon the upper side of said bar, having holes or slots therein, a groove or recess in the bar beneath the plate, and a lower die having a spindle or finger rigidly attached to it, substantially as set forth.

6. The combination of a plunger having an upper die, a horizontally movable bar adapted to support the lower die provided with means to hold the die thereon and a spindle having a box supporting plate on its end, substantially as set forth.

7. The combination of a vertically adjustable plunger, a die attached to the plunger, a cushion interposed between it and the plunger, a horizontally movable bar adapted to support the lower die, and means whereby dies of differing lengths can be attached to the bar, substantially as set forth.

8. The combination of a vertically adjustable plunger, a die attached to the plunger, a cushion interposed between it and the plunger, a horizontally movable bar adapted to support the lower die, means whereby dies of different lengths can be attached to said bar and a spindle having a plate upon its end adapted to support the box, substantially as set forth.

9. The combination in a corner staying machine of a pair of dies, a stop for the edges of the box inside of the dies, an adjustable spindle, having a support on its outer end, adapted to sustain the box near its bottom and supports which determine the position of the lower part of the box when on the machine, substantially as set forth.

10. The combination of a vertically adjustable plunger, a die on its lower end, a pressure plate on the plunger, a stop to determine the position of the inner edge of the box, a tucking finger pivoted to a lever which is connected to the plunger, the rear end of which engages with a stop during the descent of the plunger, a lower die, and an adjustable spindle adapted to support the box near its bottom, substantially as set forth.

11. The combination of a vertically adjustable plunger, a die on its lower end, a pressure plate on the plunger, a stop to determine the position of the inner edges of the box, a tucking finger pivoted to a lever which is connected with the plunger, the rear end of which engages with a stop during the descent of the plunger, a lower die, an adjustable spindle adapted to support the box near its bottom and cutting devices to sever the staying strip, substantially as set forth.

12. The combination of a vertically adjustable plunger, a die on its lower end, a lower die, a stop to determine the position of the inner edges of the box, an adjustable spindle adapted to support the box near its bottom and an adjustable support for the lower edges of the box, whereby its horizontal position between the dies can be assured, substantially as set forth.

13. The combination in a strip feeding mechanism of a pair of feed rollers, one of which revolves in a box adapted to contain water, the surface of at least one of the rollers being provided with grooves in which absorbent material, such as thread or cord is placed, substantially as set forth.

14. The combination in strip feeding mechanism of a pair of rollers, the lower one adapted to revolve in a box containing water, the surfaces of the rollers having grooves therein which run in different directions, the lowermost roller having absorbent material, such as thread or cord in the grooves, substantially as set forth.

15. The combination in strip feeding mechanism of a pair of rollers, the lower one adapted to revolve in a box containing water, the surfaces of the rollers having grooves therein, which run in different directions, the lowermost roller having absorbent material, such as thread or cord in the grooves, and guiding devices for the staying strip between the rollers and the dies, substantially as set forth.

16. The combination of a plunger, an upper die attached to the plunger, a cushion interposed between the die and the plunger, a lower die, a pair of strip feeding rollers, intermittently operated by the machine, pivoted guiding devices between the rollers and the dies, between which the staying material passes, a spindle or finger attached to the plunger, which automatically depresses the front edge of said guides during the descent of the plunger, a spring which elevates them upon the return of the plunger and severing devices, also actuated by the descent of the plunger, substantially as set forth.

17. The combination with opposing, clamping dies adapted to press adhesive material upon interposed box corners, of a reciprocating plunger, a pressure plate on the plunger, a tucking finger pivoted to a lever, which is given a rocking motion during the descent of the upper die, feeding mechanism for the strip of staying material and cutting dies for severing said strip, one of said cutting dies being rigidly attached to the plunger and the other stationary at or near the lower die, substantially as set forth.

18. The combination with opposing, clamping dies adapted to press the staying material upon interposed box corners, of means whereby the dies may automatically adjust themselves horizontally, a tucking finger pivoted to a lever which latter is given a rocking movement during the descent of the plunger, a pressure plate, which operates prior to the operation of the tucking finger, automatically acting strip feeding mechanism, comprising two rollers, one of which revolves in a tank of water and between which the staying material passes, and cutting dies for severing the staying material, one being rigidly attached to and moving with the plunger and the other stationary at or near the lower die, substantially as set forth.

19. The combination of a plunger, an upper die attached to it, a lower die, a pressure plate on the plunger, a tucking finger connected with the plunger and moved during its descent beneath the corner of the box and means whereby the said pressure plate is caused to operate before the tucking finger, and other means whereby the tucking finger passes beneath the corner of the box before the final squeeze, substantially as set forth.

20. The combination of a plunger, a pair of squeezing dies, and a tucking finger connected with the plunger and moving against the staying strip and carrying it to the inside of the corner of the box during the descent of the plunger and prior to its attaining its lowermost position, substantially as set forth.

21. The combination of a fixed die, a movable die, a tucking finger connected to move with the movable die, and an abutment for the tucking finger whereby the finger bends and tucks the end of the staying strip within the corner of the box during the movement of the upper die, substantially as set forth.

22. The combination of the squeezing dies, a tucking finger, means for moving the tucking finger vertically, and means for giving it a curved swinging movement, the tucking finger engaging with the projecting end of the staying strip during both movements, substantially as set forth.

23. The combination of the squeezing dies, a plunger, a lever, a tucking finger connected with the lever, and an abutment for the lever, substantially as set forth.

24. The combination of the squeezing dies, a plunger, a pressure plate, a tucking finger, and connections whereby the tucking finger first moves vertically and engages the staying strip and then curvilinearly and carries the strip inside the box corner, substantially as set forth.

25. The combination of the squeezing dies, a pressure plate which presses on the staying strip at the edge of the box while supported between the dies, a tucking finger, and connections for operating the same to bend the strip first downwardly and to swing it into the inside of the box corner, substantially as set forth.

26. The combination of the squeezing dies, a plunger, a lever connected with the plunger, a tucking finger connected with the lever, a stop for the lever, and an abutting surface at or near the lower die against which the tucking finger strikes, substantially as set forth.

27. The combination of the squeezing dies, plunger, tucking finger, connections between the tucking finger and plunger, and abutment for the tucking finger, substantially as set forth.

28. The combination of a cushioned upper die, a lower die adapted to rock laterally, a tucking finger and means to move the finger first downwardly and to swing it on a curve, substantially as set forth.

29. A tucking finger for box staying machines, the working face whereof is made in the form of converging plates or edges, and a central plate or edge located between the said converging edges, substantially as set forth.

Signed at New York, in the county of New York and State of New York, this 1st day of February, A. D. 1894.

HORACE INMAN.

Witnesses:
PHILLIPS ABBOTT,
JOHN E. LACEY.